Nov. 27, 1951  A. WULLSCHLEGER  2,576,202
DEVICE COMPRISING AT LEAST ONE LEVEL VIAL
Filed April 16, 1948
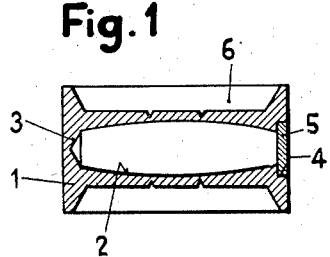
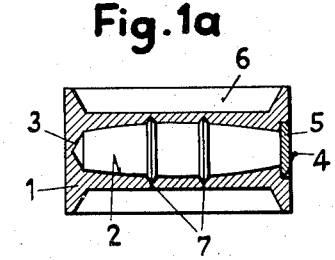
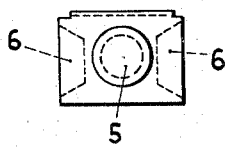
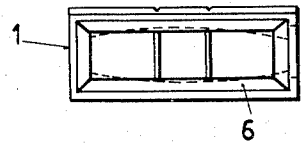
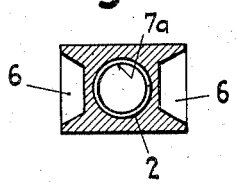
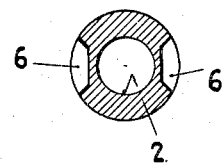
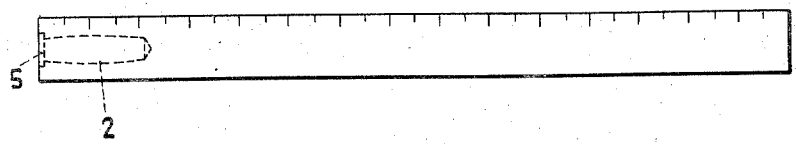
INVENTOR
ALBERT WULLSCHLEGER
BY
Toulmin & Toulmin
ATTORNEYS Patented Nov. 27, 1951

2,576,202

UNITED STATES PATENT OFFICE 2,576,202

DEVICE COMPRISING AT LEAST ONE LEVEL VIAL

Albert Wullschleger, Weiningen, Switzerland

Application April 16, 1948, Serial No. 21,435
In Switzerland May 3, 1947

2 Claims. (Cl. 33—211)

The invention relates to a device containing at least one level vial in which at least the component containing the bore of the level vial is made of transparent synthetic resin.

Usually glass tubes were used for level vials which were then partly filled with liquid, and closed. The present invention is based on the idea to arrange barrel shaped level vial bores directly in transparent bodies of synthetic resin. Thus it is possible in the case of a water level to provide a level vial body of transparent synthetic resin which has a level vial bore closed by a cover-disc. Alternatively it is possible to equip for example a straight edge with a level vial bore, the whole straight edge consisting of transparent synthetic resin. In this case the device may be used for two different purposes namely as a straight edge and also as a water level.

In the accompanying drawings some forms of embodiment of the invention are shown by way of example, viz:

Fig. 1 shows a longitudinal section through a level vial body which is arranged on a water level.

Fig. 1a is a corresponding section of another embodiment.

Fig. 2 shows a front view of the body of the level vial.

Fig. 2a is a cross section of the embodiment of Figure 1a but shown as rotated by 90°.

Fig. 3 is a lateral view of the level vial shown in Fig. 2.

Fig. 4 is an elevation of a straight edge.

Fig. 5 is a cross section of another embodiment of a level vial.

The body of the level vial consists of transparent synthetic resin e. g. of the hyaline synthetic resin known under the trade-name of Plexiglas. The body 1 is provided with a barrel shaped bore 2 extending longitudinally which represents the level vial bore and is filled in use with oil of low viscosity. The one end 3 of the bore 2 is closed by not being completely drilled through when making it. At the other end a shouldered surface 4 is provided into which a disc 5 can be inserted that consists of the same material as the insert body 1 proper. The connection can be established absolutely tightly by any known cement.

The body of the level vial has lateral windows 6 which facilitate reading the level vial. The external shape is however rectangular as will be seen from Fig. 3 so that the insert body can be easily screwed to a water level.

The body of the level vial may however be of circular cylindrical shape (Fig. 5) whereby its manufacture and machining is simplified.

The grooves 7 represented in Fig. 1 may be arranged instead of on the outside of the body 1, on the inside thereof (Fig. 1a). They may be made of a dark mass e. g. a pigmented lacquer. It is also possible to insert a snap ring 7a in the grooves in question (Fig. 2a).

The idea according to the invention can however also be applied for example to straight edges as explained hereabove, which are provided with a level vial bore 2 extending in their longitudinal direction (Fig. 4).

The embodiment as described has the advantage that the level vial is unbreakable and that it is suitable for being readily fitted to devices of various kind e. g. in water levels. The weight is low and it is possible to afford a free view on the level vial from all sides. The use of an oil of low viscosity has the additional advantage that it does not freeze readily.

The barrel shaped level vial bore has the advantage compared with the known small tubes having a cambered longitudinal axis, that the level vial can be used in any position, i. e. the body 1 can be placed on any of the four lateral surfaces shown in Fig. 2 in front view and it will still allow correct reading since the level vial bore is designed as a body of rotation.

By selection of a suitable curvature of the inner wall of the level vial one has control over making the sensitivity of reading greater or smaller. A larger radius of curvature would e. g. permit a higher accuracy of reading.

What I claim as my invention and desire to secure by Letters Patent, is:

1. A level vial comprising in combination, a transparent body of synthetic resin having a cavity therein with the longitudinal axis of the latter corresponding to the longitudinal axis of said body, said cavity being provided with markings formed on the inner wall side of said cavity and transverse to the longitudinal axis of said cavity, said markings being in the shape of a plurality of circular grooves, snap rings inserted in said grooves, and liquid means filling said cavity only to such an extent as to leave a gas bubble between said grooves.

2. A level vial comprising in combination, a transparent body member having an elongated cavity therein, said cavity being provided with axially spaced peripheral grooves formed on the inner wall side of said cavity and in planes transverse to the longitudinal axis of said cavity, spring means inserted in said grooves, liquid means filling said cavity only to such an extent as to leave a gas bubble between said grooves, and the wall section of the body member being of reduced thickness along at least one side of the cavity to form a viewing window for observing the said bubble.

ALBERT WULLSCHLEGER.

REFERENCES CITED

The following references are of record in the file of this patent:

UNITED STATES PATENTS

| Number | Name | Date |
| --- | --- | --- |
| 562,679 | Traut | June 23, 1896 |
| 777,641 | Knighton | Dec. 13, 1904 |
| 988,637 | Graul | Apr. 4, 1911 |
| 1,082,163 | Lung | Dec. 23, 1913 |
| 1,488,419 | Ward | Mar. 25, 1924 |
| 2,305,678 | Cravaritis | Dec. 22, 1942 |
| 2,432,124 | Raines et al. | Dec. 9, 1947 |

FOREIGN PATENTS

| Number | Country | Date |
| --- | --- | --- |
| 559,325 | Great Britain | 1944 |

OTHER REFERENCES

Article in the magazine "Modern Plastics," April 1945, entitled "Spirit Level," pages 122 and 123.